US012749246B2

(12) United States Patent
Yamakawa et al.

(10) Patent No.: US 12,749,246 B2
(45) Date of Patent: Sep. 29, 2026

(54) MEDICAL IMAGE PROCESSING APPARATUS AND MEDICAL IMAGE PROCESSING METHOD

(71) Applicant: FUJIFILM Healthcare Corporation, Kashiwa (JP)

(72) Inventors: Keisuke Yamakawa, Kashiwa (JP); Taiga Goto, Kashiwa (JP)

(73) Assignee: FUJIFILM Corporation, Tokyo (JP)

( * ) Notice: Subject to any disclaimer, the term of this patent is extended or adjusted under 35 U.S.C. 154(b) by 655 days.

(21) Appl. No.: 17/701,826

(22) Filed: Mar. 23, 2022

(65) Prior Publication Data

US 2022/0319072 A1 Oct. 6, 2022

(30) Foreign Application Priority Data

Apr. 6, 2021 (JP) ................................ 2021-064617

(51) Int. Cl.

*G06T 12/30* (2026.01)
*G06T 5/50* (2006.01)
*G06T 7/00* (2017.01)

(52) U.S. Cl.

CPC ................ *G06T 12/30* (2026.01); *G06T 5/50* (2013.01); *G06T 7/0012* (2013.01); *G06T 2207/10081* (2013.01)

(58) Field of Classification Search

CPC ............ G06T 11/008; G06T 5/50; G06T 5/60
See application file for complete search history.

(56) References Cited

U.S. PATENT DOCUMENTS

2020/0205769 A1* 7/2020 Kotian .................. A61B 6/542
2020/0305806 A1 10/2020 Tang et al.
2021/0035338 A1 2/2021 Zhou et al.
2024/0135603 A1* 4/2024 Favazza .............. G06V 10/774

FOREIGN PATENT DOCUMENTS

CN 1 05 22 52 08 1/2016
CN 08 93 79 95 12/2018
CN 1 12 30 87 88 2/2021

(Continued)

OTHER PUBLICATIONS

Y. Zhang and H. Yu, "Convolutional Neural Network Based Metal Artifact Reduction in X-Ray Computed Tomography," in IEEE Transactions on Medical Imaging, vol. 37, No. 6, pp. 1370-1381, Jun. 2018.

(Continued)

*Primary Examiner* — Peter K Huntsinger

(57) ABSTRACT

A medical image processing apparatus and a medical image processing method are provided which are capable of reducing metal artifacts and preserving the image quality even in a region less affected by metal artifacts. The medical image processing apparatus includes an arithmetic section that reconstructs a tomographic image from projection data of an object under examination including a metal. The arithmetic section acquires a machine learning output image that is output when the tomographic image is input to a machine learning engine that machine-learns to reduce metal artifacts, and the arithmetic section composites the machine learning output image and the tomographic image to generate a composite image.

13 Claims, 6 Drawing Sheets

(56) References Cited

FOREIGN PATENT DOCUMENTS

| | | | | |
|---|---|---|---|---|
| JP | 2017-131307 A | | 8/2017 | |
| JP | 2020-163124 A | | 10/2020 | |
| WO | WO-2017063569 A1 | * | 4/2017 | ........... G06T 11/008 |

OTHER PUBLICATIONS

Jan. 9, 2024 Japanese official action (machine translation) in connection with Japanese Patent Application No. 2021-064617.

Nov. 28, 2025 Chinese official action (and English-language translation thereof) in connection with Patent Application No. 2022103281891.

Mar. 5, 2026 Chinese official action (and English-language translation thereof) in connection with Chinese Patent Application No. 2022103281891.

* cited by examiner

MEDICAL IMAGE PROCESSING APPARATUS AND MEDICAL IMAGE PROCESSING METHOD

CLAIM OF PRIORITY

The present application claims priority from Japanese Patent Application JP 2021-064617 filed on Apr. 6, 2021, the content of which is hereby incorporated by reference into this application.

BACKGROUND OF THE INVENTION

The present invention relates to an apparatus and a method for processing medical images obtained by a medical imaging apparatus such as an X-ray CT (Computed Tomography) apparatus or the like and, more particularly, to technologies for reducing metal artifacts which may be introduced by a metal if included in an object under examination.

The X-ray CT apparatus which is an example of medical imaging apparatus irradiates an object under examination with X rays from surroundings of the object under examination to acquire projection data at a plurality of projection angles, and projects back the projection data in order to reconstruct a tomographic image of the object under examination for use in diagnostic imaging. A metal, e.g., a plate for bone fixation or the like, if included within the object under examination, introduces metal artifacts which are artifacts affected by the metal in a medical image to interfere with the diagnostic imaging. The technology to reduce the metal artifacts is referred to as MAR (Metal Artifact Reduction), and various techniques have been developed such as a beam hardening correction technique, a linear interpolation technique, a deep learning technique and the like, but each technique has its advantages and disadvantages.

For example, the literature, Y. Zhang and H. Yu, "Convolutional Neural Network Based Metal Artifact Reduction in X-Ray Computed Tomography," in IEEE Transactions on Medical Imaging, vol. 37, no. 6, pp. 1370-1381, June 2018, discloses a combination of the advantages of the techniques by performing the beam hardening correction technique and the linear interpolations technique to obtain images with metal artifacts reduced, and by applying an original image and the obtained images to the deep learning technique as input images.

However, in the above literature, although the metal artifacts are reduced, a degradation in image quality may be caused in a region less affected by the metal artifacts, for example, in a region away from the metal.

SUMMARY OF THE INVENTION

It is accordingly an object of the invention to provide a medical image processing apparatus and a medical image processing method which are capable of reducing metal artifacts and preserving the image quality even in a region less affected by the metal artifacts.

To achieve the object, an aspect of the present invention provides a medical image processing apparatus including an arithmetic section that reconstructs a tomographic image from projection data of an object under examination including a metal. The arithmetic section acquires a machine learning output image that is output when the tomographic image is input to a machine learning engine that machine-learns to reduce metal artifacts, and composites the machine learning output image and the tomographic image to generate a composite image.

Another aspect of the present invention provides a medical image processing method to reconstruct a tomographic image from projection data of an object under examination including a metal, which includes the steps of: acquiring a machine learning output image that is output when the tomographic image is input to a machine learning engine that machine-learns to reduce metal artifacts; and compositing the machine learning output image and the tomographic image to generate a composite image.

According to the present invention, a medical image processing apparatus and a medical image processing method can be provided to reduce metal artifacts without losing detailed anatomy in a metal region.

DETAILED DESCRIPTION OF THE PREFERRED EMBODIMENTS

Embodiments of a medical image processing apparatus and a medical image processing method according to the present invention will now be described with reference to the accompanying drawings. It is noted that throughout the following description and the accompanying drawings, like reference signs are used to indicate components/elements having like functional configurations for the purpose of avoiding repeated description.

First Embodiment

Figure 1:
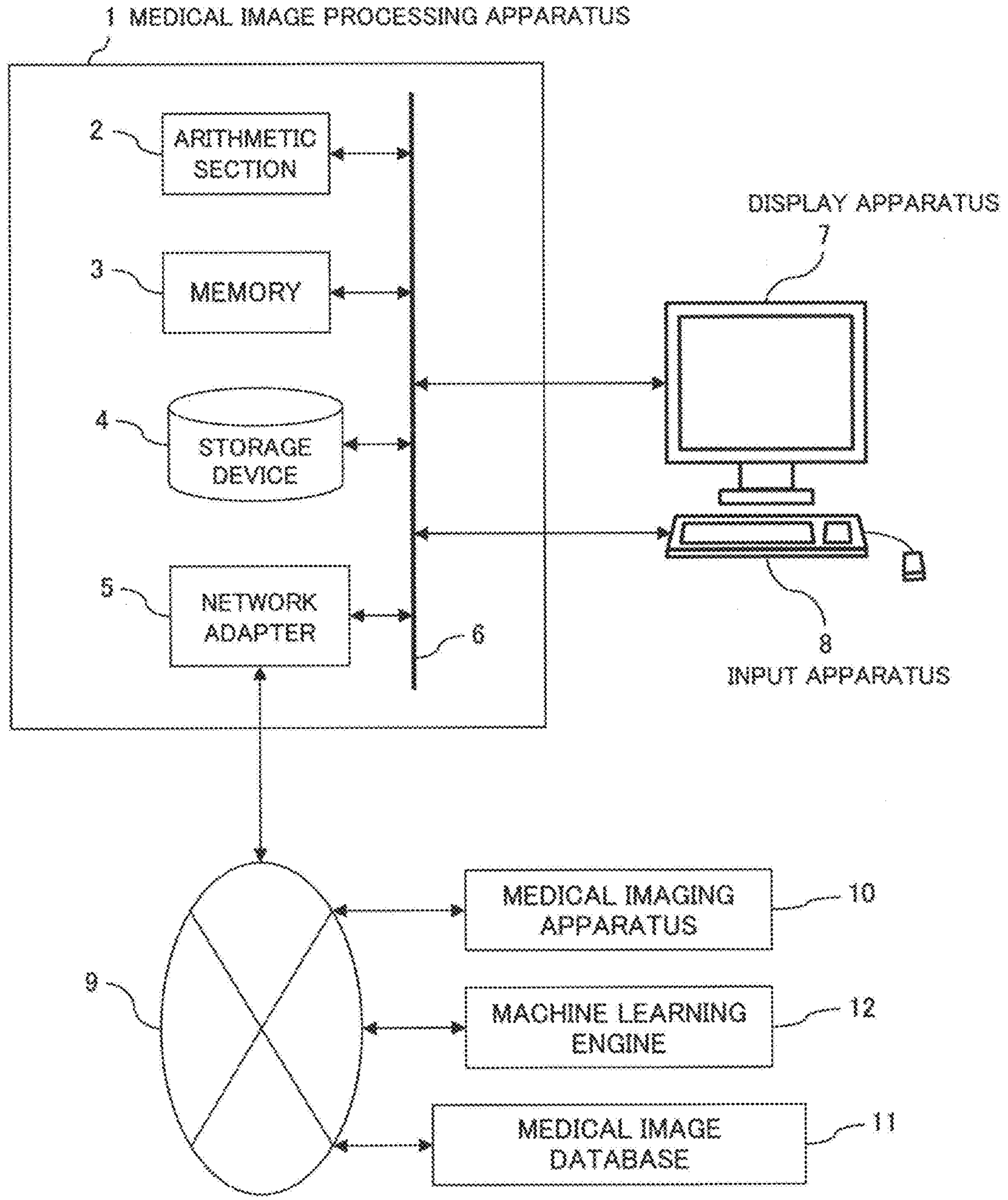
FIG. 1 is an overall configuration diagram of a medical image processing apparatus.

FIG. 1 is a diagram illustrating a hardware configuration of a medical image processing apparatus 1. The medical image processing apparatus 1 includes an arithmetic section 2, memory 3, a storage device 4 and a network adapter 5, which are interconnected therebetween through a system bus 6 such that they can transmit and receive signals. The medical image processing apparatus 1 is connected to a medical imaging apparatus 10, a medical image database 11, and a machine learning engine 12 via a network 9 such that they can transmit and receive signals. The medical image processing apparatus 1 is connected to a display apparatus 7 and an input apparatus 8. As used herein, the phrase "can transmit and receive signals" expresses a condition in which signals can be electrically or optically transmitted and received among them or from one to another irrespective of wired or wireless connection.

The arithmetic section 2 controls operation of each component, which specifically is CPU (Central Processing Unit), MPU (Micro Processor Unit) and/or the like. The arithmetic section 2 loads and executes programs and data required to execute the programs which are stored in the storage device 4, into the memory 3 in order to perform various types of image processing on a medical image. The memory 3 stores the progress of a program and/or arithmetic processing which are executed by the arithmetic section 2. The storage device 4 stores programs executed by the arithmetic section 2 and data required to execute the programs, which specifically is HDD (Hard Disk Drive), SSD (Solid State Drive) and/or the like. The network adapter 5 connects the medical image processing apparatus 1 to the network 9 such as LAN, telephone lines, the Internet and/or the like. Various data handled by the arithmetic section 2 may be transmitted to and received from the exterior of the medical image processing apparatus 1 via the network 9 such as LAN (Local Area Network) or the like.

The display apparatus 7 displays processing results of the medical image processing apparatus 1, and the like, which specifically is a liquid crystal display and/or the like. The input apparatus 8 is an operation device through which an operator provides operation instructions to the medical image processing apparatus 1, which specifically is a keyboard, a mouse, a touch panel, and/or the like. The mouse may be replaced with another pointing device such as a track pad, a track ball, and the like.

Figure 2:
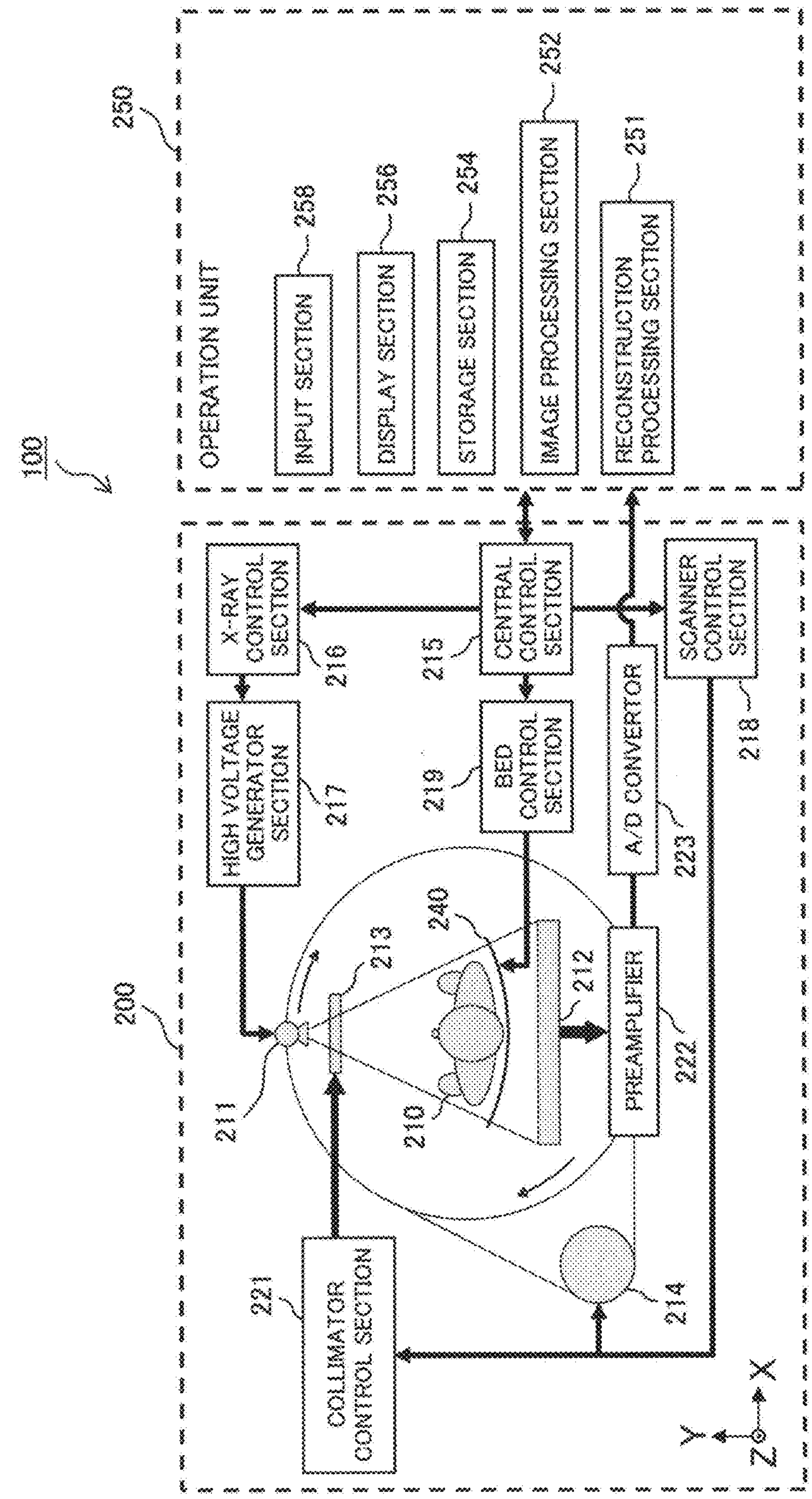
FIG. 2 is an overall configuration diagram of an X-ray CT apparatus illustrated as an example of medical imaging apparatus.

The medical imaging apparatus 10 is an X-ray CT (Computed Tomography) apparatus that acquires, for example, projection data of an object under examination and reconstructs a tomographic image from the projection data, which will be described later with reference to FIG. 2. The medical image database 11 is a database system that stores the projection data and the tomographic images acquired by the medical imaging apparatus 10, and correction images obtained by processing the tomographic images, and the like.

The machine learning engine 12 is generated by machine-learning to reduce the metal artifacts included in the tomographic image, and is configured using, for example, CNN (Convolutional Neural Network). For the generation of the machine learning engine 12, for example, a tomographic image without metal is used as a teacher image. For the input image, images obtained by adding a metal region to the teacher image in question are sequentially projected to create projection data including the metal, and thus a tomographic image including metal artifacts obtained by projecting back the projection data in question is used.

An overall configuration diagram of an X-ray CT apparatus 100 which is an example of the medical imaging apparatus 10 is described with reference to FIG. 2, in which the lateral direction is defined as an X axis, the vertical direction is defined as a Y axis and a direction perpendicular to the plane of paper is defined as a Z axis. The X-ray CT apparatus 100 includes a scanner 200 and an operation unit 250. The scanner 200 has an X-ray tube 211, a detector 212, a collimator 213, a drive section 214, a central control section 215, an X-ray control section 216, a high voltage generator section 217, a scanner control section 218, a bed control section 219, a collimator control section 221, a preamplifier 222, an A/D convertor 223, a bed 240, and the like.

The X-ray tube 211 is an apparatus that irradiates with X rays the object under examination 210 placed on the bed 240. The high voltage generator section 217 generates a high voltage in accordance with a control signal transmitted from the X-ray control section 216, and the high voltage is applied to the X-ray tube 211, so that the object under examination is irradiated with X rays from the X-ray tube 211.

The collimator 213 is apparatus that limits the irradiation range of the X rays emitted from the X-ray tube 211. The X-ray irradiation range is set in accordance with a control signal transmitted from the collimator control section 221.

The detector 212 detects the X rays passing through the object under examination 210 to measure spatial distribution of the passing X rays. The detector 212 is disposed on the opposite side from the X-ray tube 211, and a plurality of detecting elements is two-dimensionally arranged in a plane facing the X-ray tube 211. A signal measured by the detector 212 is amplified at the preamplifier 222, and then converted to a digital signal at the A/D convertor 223. Then, various types of correction processing are performed on the digital signal in order to acquire projection data.

The drive section 214 rotates the X-ray tube 211 and the detector 212 around the object under examination 210 in accordance with a control signal provided from the scanner control section 218. The projection data from a plurality of projection angles is acquired through the rotation of the X-ray tube 211 and the detector 212 and the irradiation and detection of the X rays. A unit of data collection at each projection angle is referred to as a "view". In the array of the two-dimensionally arranged detecting elements of the detector 212, the rotation direction of the detector 212 are referred to as a "channel" and a direction perpendicular to a channel is referred to as a "row". The projection data is identified by a view, a channel, and a row.

The bed control section 219 controls the operation of the bed 240 such that the bed 240 remains at rest while X-ray irradiation and detection occur, and moves with constant velocity in the Z axis direction which is the direction of the body axis of the object under examination 210. Scanning performed while the bed 240 remains at rest is referred to as an axial scan, and scanning performed while the bed 240 is moving is referred to as a helical scan.

The central control section 215 controls the abovementioned operation of the scanner 200 in accordance with instructions from an operation unit 250 which is described as follows. The operation unit 250 has a reconstruction processing section 251, an image processing section 252, a storage section 254, a display section 256, an input section 258, and the like.

The reconstruction processing section 251 reconstructs a tomographic image by projecting back the projection data acquired by the scanner 200. The image processing section 252 performs various types of image processing on the tomographic image in order to obtain an image suitable for diagnosis. The storage section 254 stores projection data, tomographic images, and images after the image processing. The display section 256 displays tomographic images and images after the image processing. The input section 258 is used by the operator setting acquisition conditions of projection data (a tube voltage, a tube current, a scan speed, and/or the like) and reconstruction conditions of a tomographic image (reconstruction filter, FOV size, and/or the like).

The operation unit 250 may be the medical imaging processing apparatus 1 illustrated in FIG. 1. In this case, the reconstruction processing section 251 and the image processing section 252 correspond to the arithmetic section 2, the storage section 254 corresponds the storage device 4, the display section 256 corresponds to the display apparatus 7, and the input section 258 corresponds to the input apparatus 8.

Figure 3:
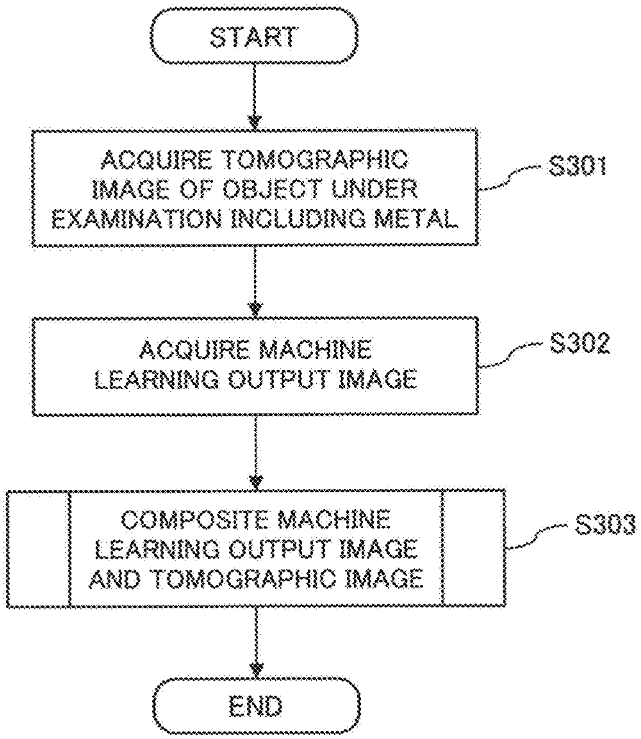
FIG. 3 is a flow diagram of example processing according to a first embodiment.

An example of the flow of processing executed in a first embodiment is described for each step with reference to FIG. 3.

S301

Figure 4:
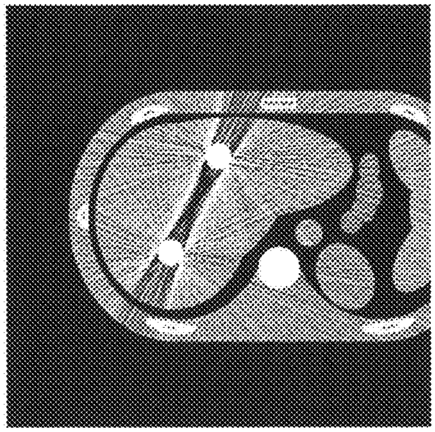
FIG. 4 is a diagram illustrating an example of metal artifacts.

The arithmetic section 2 acquires a tomographic image I_ORG of the object under examination including a metal. Due to the metal included in the object under examination, the tomographic image I_ORG includes metal artifacts. An example of the metal artifacts is shown in FIG. 4 that presents a tomographic image of an abdominal phantom in which a dark band occurs between two metal regions existing within the liver and streak artifacts emanate from each metal region.

S302

The arithmetic section 2 acquires a machine learning output image I_MAR to be output when the tomographic image I_ORG is input to the machine learning engine 12 that has machine-learned to reduce metal artifacts. In the machine learning output image I_MAR, the metal artifacts are reduced, but the image quality may be degraded in a region less affected by the metal artifacts, for example, in a region away from the metal.

S303

The arithmetic section 2 composites the machine learning output image I_MAR acquired in S302 and the tomographic image I_ORG acquired in S301. In the machine learning output image I_MAR, the image quality may be degraded in the region less affected by the metal artifacts, whereas in the tomographic image I_ORG, a degradation in image quality is not caused in the region less affected by the metal artifacts. Therefore, the machine learning output image I_MAR and the tomographic image I_ORG are composited together to generate a composite image so that the metal artifacts are reduced and the image quality is preserved in the region less affected by the metal artifacts. The generated composite image is displayed on the display apparatus 7 or stored in the storage device 4.

Figure 5:
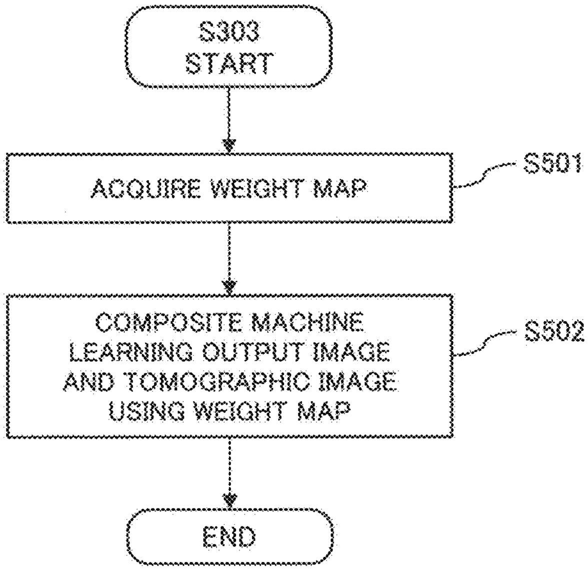
FIG. 5 is a flow diagram of example processing in step S303 according to the first embodiment.

An example of the flow of processing in S303 is described for each step with reference to FIG. 5.

S501

The arithmetic section 2 acquires a weight map in which weight coefficients w which are real numbers between zero and one (inclusive) are mapped. The weight map I_w is generated from, for example, the following equation.

$$I\_w = |I\_ORG - I\_BHC| \quad \text{(Eq. 1)}$$

where I_BHC is a beam hardening correction image that is obtained by applying the beam hardening correction technique to the tomographic image I_ORG.

The beam hardening correction image I_BHC is obtained by, for example, using the following procedure. Initially, a metal pixel is extracted from the tomographic image I_ORG. Then, the projection value corresponding to the metal pixel is corrected in projection data P ORG used for generation of the tomographic image I_ORG, so that projection data P_BHC is obtained. A projection value corresponding to the metal pixel is corrected by using the projection value in question and a length of the metal pixel on a projection line associated with the projection value in question. Specifically, the longer the length of the metal pixel on the projection line or the larger the projection value, the greater the correction strength becomes. And the projection data P_BHC is projected back and then is added to or subtracted from the tomographic image I_ORG in order to obtain the beam hardening correction image I_BHC.

The weight map I_w may be generated from the following equation.

$$I\_w = |I\_ORG - I\_LI| \quad \text{(Eq. 2)}$$

where I_LI is a linear interpolation image that is obtained by applying the linear interpolations technique to the tomographic image I_ORG.

The linear interpolation image I_LI is obtained by, for example, using the following procedure. Initially, a metal pixel is extracted from the tomographic image I_ORG. Then, in the projection data P ORG used to generate the tomographic image I_ORG, a projection value corresponding to the metal pixel is linearly interpolated with a projection value adjacent thereto to generate a projection value which is substituted, thereby obtaining projection data P_LI. Then, the projection data P_LI is back-projected and the extracted metal pixels are composited, so that the linear interpolation image I_LI is obtained.

Because the beam hardening correction image I_BHC and the linear interpolation image I_LI are images with reduced metal artifacts, the weight map I_w generated from Equation 1, 2 is also an artifact map indicating a probability distribution of presence of metal artifacts.

S502

The arithmetic section 2 uses the weight coefficient w in the weight map I_w acquired at S501 to composite the machine learning output image I_MAR and the tomographic image I_ORG to create a composite image I_CMP. For example, the following equation is used for generation of the composite image I_CMP.

$$I\_CMP = w \cdot I\_MAR + (1-w) \cdot I\_ORG \quad \text{(Eq. 3)}$$

According to Equation 3, the product of each pixel value of the machine learning output image I_MAR multiplied by the weight coefficient w which is each pixel value in the weight map I_w is added to the product of each pixel value of the tomographic image I_ORG multiplied by (1−w). Stated another way, in a region with many metal artifacts, the ratio of machine learning output image I_MAR is higher, and in a region with fewer metal artifacts, the ratio of the tomographic image I_ORG is higher. As a result, in the composite image I_CMP, the metal artifacts are reduced and the image quality is preserved in the region less affected by the metal artifacts.

The beam hardening correction image I_BHC is an image obtained based on correction of a projection value corresponding to a metal pixel. Therefore, if the weight map I_w of Equation 1 is used, the artifacts in the region more affected by the metal pixel can be further reduced. The linear interpolation image I_LI is an image obtained by linearly interpolating the projection value corresponding to the metal pixel with a projection value adjacent thereto. Therefore, if the weight map I_w of Equation 2 is used, the artifacts directly introduced by the metal can be further reduced.

Because the metal artifacts become smaller in size with an increasing distance from the metal pixel extracted from the tomographic image I_ORG, the weight coefficient w becomes smaller with an increasing distance from the metal pixel. Also, the larger the pixel value of the metal pixel, the larger the metal artifact becomes. Therefore, the larger the pixel value of the metal pixel, the higher the weight coefficient w becomes.

For the weight coefficient w, by using any of the tomographic image I_ORG, the machine learning output image I_MAR, the beam hardening correction image I_BHC, and the linear interpolation image I_LI, the weight map I_w may be adjusted depending on tissue in the object under examination and/or tissue such as air and/or the like. For example, well-known thresholding-based segmentation is used to divide the tomographic image I_ORG into regions of metal, the object under examination other than metal, and air, and the weight coefficient w may be adjusted using prior information on images such as the machine learning output image I_MAR (w=1) for the metal, the weight map I_w for the object under examination other than the metal, and the tomographic image I_ORG (w=0) for air.

Also, the weight coefficient w may be adjusted as appropriate by the operator. For example, an adjustment coefficient set by the operator may be used to adjust the weight coefficient w. The adjustment coefficient is a real number between zero and one (inclusive), and all the weight coefficients w are simultaneously adjusted by multiplying the weight map I_w by the adjustment coefficient. In short, all the weight coefficients w included in the weight map I_w are multiplied by the same adjustment coefficient.

An example of manipulation windows used for setting of the adjustment coefficient is described with reference to FIG. 6, which illustrates a manipulation window having an input image display portion 601, a composite image display portion 602, and an adjustment coefficient setting portion 603 for example purpose. In the input image display portion 601, the tomographic image I_ORG including metal artifacts and the machine learning output image I_MAR output from the machine learning engine 12 are displayed. The input image display portion 601 is not necessary. In the composite image display portion 602, the composite image I_CMP generated in S502 is displayed. The adjustment coefficient setting portion 603 is used to set an adjustment coefficient by which the weight coefficient w is multiplied, and includes, for example, a slide bar and/or a text box. The adjustment coefficient setting portion 603 may be configured such that an adjust coefficient is set for each position in a direction of body axis of the object under examination 210, that is, for each slice position.

Figure 6:
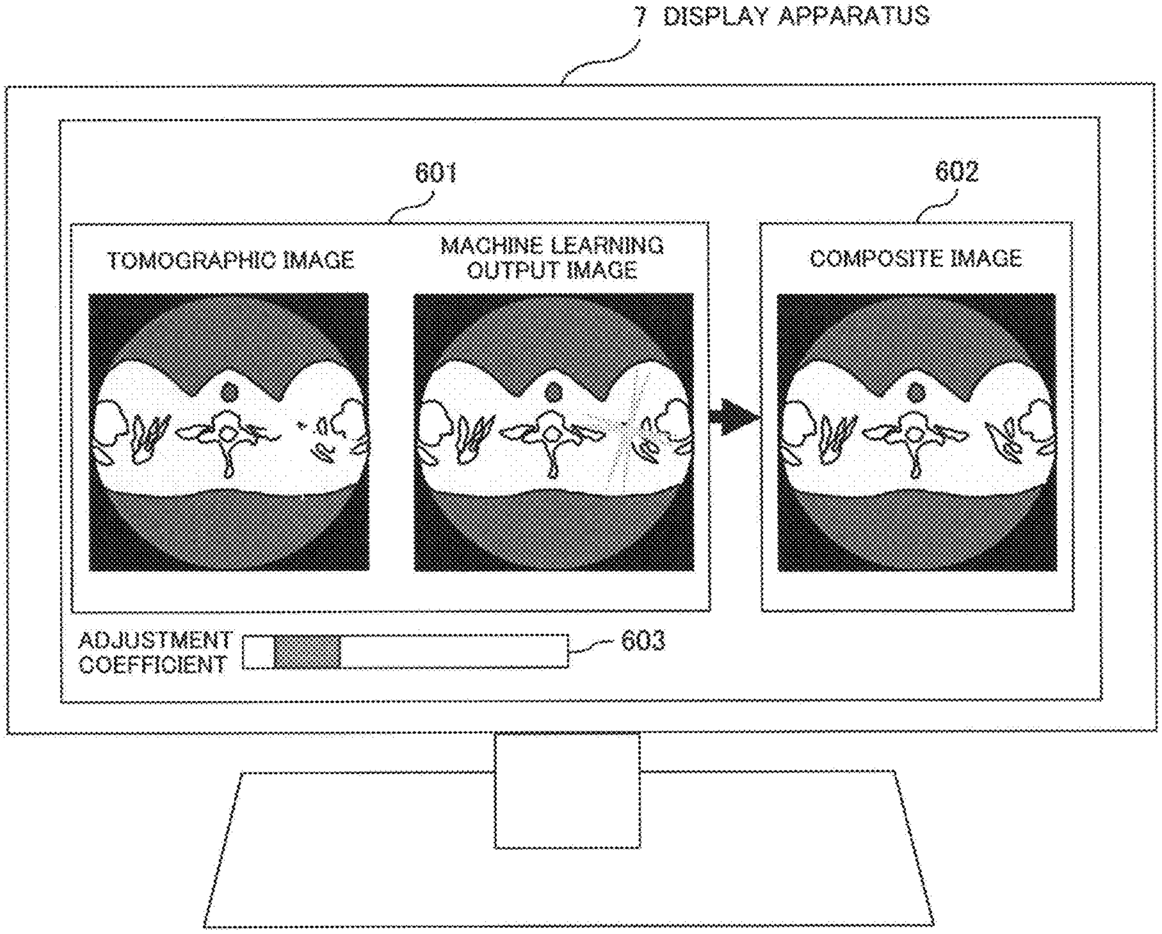
FIG. 6 is a diagram illustrating an example manipulation window according to the first embodiment.

The operator can use the manipulation screen illustrated in FIG. 6 for example purpose, to check the composite image I_CMP updated every time the adjustment coefficient is set. If the input image display portion 601 is displayed, the adjustment coefficient can be set while performing a comparison of the composite image I_CMP with the tomographic image I_ORG and/or the machine learning output image I_MAR.

It is noted that, without limitation to the above artifacts introduced by a metal, similar means can be used to reduce artifacts that are introduced by a high absorber having a high X-ray absorption coefficient such as bone, a contrast medium, and the like other than a metal, and artifacts that are introduced by a low absorber having an extremely lower X-ray absorption coefficient, such as a lung field, an intestinal canal, and the like, in comparison with tissues of an object under examination.

By the flow of processing described above, a composite image can be provided in which the metal artifacts are reduced and the image quality can be preserved even in a region less affected by the metal artifacts.

Second Embodiment

The composite image I_CMP generated by compositing the tomographic image I_ORG and the machine learning output image I_MAR output from the machine learning engine 12 has been described in the first embodiment. In a second embodiment, a correction image with reduced metal artifacts is described which is acquired by inputting, to the machine learning engine 12, the tomographic image I_ORG and an artifact map indicating a probability distribution of presence of metal artifacts. The hardware configuration of the medical image processing apparatus 1 in the second embodiment is the same as that in the first embodiment and a description is omitted.

Figure 7:
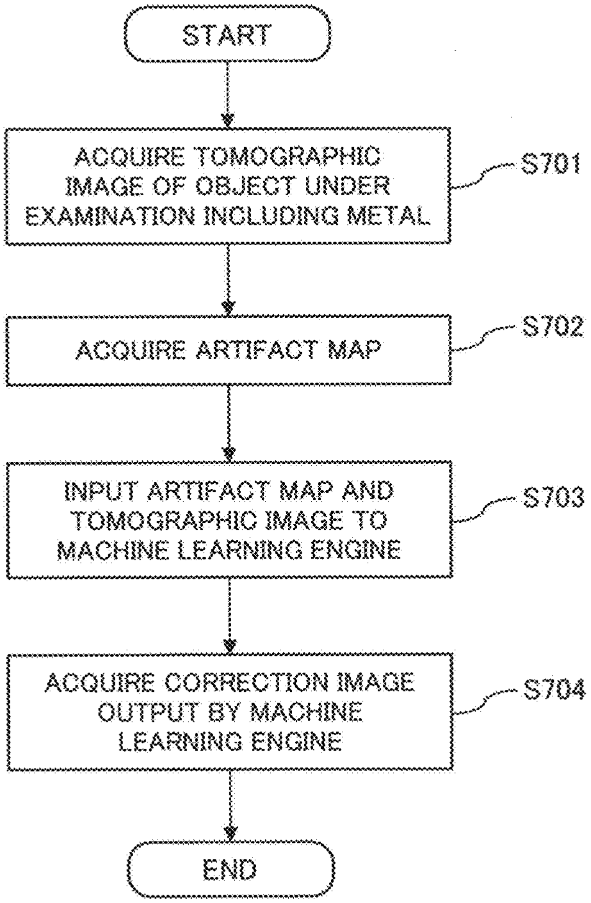
FIG. 7 is a flow diagram of example processing according to a second embodiment.

An example of the flow of processing executed in the second embodiment is described for each step with reference to FIG. 7.

S701

In like manner with S301, the arithmetic section 2 acquires a tomographic image I_ORG of an object under examination including a metal.

S702

The arithmetic section 2 acquires an artifact map indicating a probability distribution of presence of metal artifacts. The artifact map may be generated using, for example, Equations 1 and 2.

S703

The arithmetic section 2 inputs, to the machine learning engine 12, the artifact map acquired in S702 and the tomographic image I_ORG acquired in S701. The machine learning engine 12 receives the tomographic image I_ORG and the artifact map, and outputs a correction image in which the metal artifacts are reduced and the image quality is preserved even in the region less affected by the metal artifacts.

S704

The arithmetic section 2 acquires the correction image output from the machine learning engine 12 in S703. The acquired correction image is displayed by the display apparatus 7 and/or stored in the storage device 4.

By the flow of processing described above, a correction image can be obtained in which the metal artifacts are reduced and the image quality is preserved even in a region less affected by the metal artifacts. It is to be understood that, in S703, the beam hardening correction image I_BHC and/or the linear interpolation image I_LI may be additionally input to the machine learning engine 12. Additionally inputting the beam hardening correction image I_BHC and/or the linear interpolation image I_LI allows the machine learning engine 12 to output a correction image with further reduced metal artifacts.

A plurality of example embodiments according to the present invention has been described. It is to be understood that the present invention is not limited to the above examples and may be embodied by modifying components thereof without departing from the spirit or scope of the present invention. Further, a plurality of components disclosed in the above examples may be combined as appropriate. Further, several components of all the components described in the above examples may be omitted.

REFERENCE SIGNS LIST

- 1 . . . medical image processing apparatus
- 2 . . . arithmetic section
- 3 . . . memory
- 4 . . . storage device
- 5 . . . network adaptor
- 6 . . . system bus
- 7 . . . display apparatus
- 8 . . . input apparatus
- 10 . . . medical imaging apparatus
- 11 . . . medical image database
- 12 . . . machine learning engine
- 100 . . . X-ray CT apparatus

200 . . . scanner
210 . . . object under examination
211 . . . X-ray tube
212 . . . detector
213 . . . collimator
214 . . . drive section
215 . . . central control section
216 . . . X-ray control section
217 . . . high voltage generator section
218 . . . scanner control section
219 . . . bed control section
221 . . . collimator control section
222 . . . preamplifier
223 . . . A/D convertor
240 . . . bed
250 . . . operation unit
251 . . . reconstruction processing section
252 . . . image processing section
254 . . . storage section
256 . . . display section
258 . . . input section
601 . . . input image display portion
602 . . . composite image display portion
603 . . . adjustment coefficient setting portion

What is claimed is:

1. A medical image processing apparatus comprising a processor and a non-transitory storage medium storing one or more programs and data for executing the programs, the programs being instructions executable by the processor to configure said medical image processing apparatus to perform a method comprising:

obtaining tomographic image data by reconstructing a tomographic image from projection data of an object under examination including a metal, the reconstructed tomographic image including metal artifacts;

obtaining machine learning output image data by acquiring a machine learning output image that includes reduced metal artifacts and is output when the tomographic image data is input to a machine learning engine that has machine-learned to reduce the metal artifacts in the tomographic image of the object under examination;

acquiring a weight map based on a beam hardening correction image obtained by applying beam hardening correction to the tomographic image, weight coefficients of the weight map being mapped, and the weight map indicating a probability distribution of a presence of metal artifacts; and generating a composite image, by using the weight map based on the beam hardening correction image, to composite (i) the machine learning output image data and (ii) the tomographic image data of the tomographic image of the object under examination, wherein for the machine learning output image data and the tomographic image data that are composited, an image quality of a region of the machine learning output image that is less affected by the metal artifacts than a corresponding region of the tomographic image that includes the metal artifacts is degraded relative to an image quality of a corresponding region in the tomographic image less affected by the metal artifacts, and an image quality of a counterpart region of the composite image corresponding to the region of the machine learning output image and the corresponding region in the tomographic image is preserved relative to an image quality of the corresponding region in the tomographic image which is composited with the machine learning output image, and wherein the machine learning output image and the tomographic image are composited together by using a value obtained by multiplying the weight coefficient by an adjustment coefficient set in an adjustment coefficient setting portion, the composite image is displayed in a same window as the adjustment coefficient setting portion and is updated every time the adjustment coefficient is set in the adjustment coefficient setting portion, and the same window includes an input image display portion displaying the tomographic image and the machine learning output image.

2. The medical image processing apparatus according to claim 1, wherein the weight map indicates a distribution of absolute values of differences between the tomographic image and a linear interpolation image that is obtained by applying a linear interpolation technique to the tomographic image.

3. The medical image processing apparatus according to claim 1, wherein the weight coefficients become smaller with an increasing distance from a metal pixel extracted from the tomographic image.

4. The medical image processing apparatus according to claim 3, wherein the weight coefficient becomes larger as the metal pixel has a larger pixel value.

5. The medical image processing apparatus according to claim 1, wherein each weight coefficient w is a real number between 0 and 1, and for each pixel of the composite image, (a) a pixel value of the machine learning output image is weighted by w, (b) a pixel value of the tomographic image is weighted by (1−w), and (c) the weighted pixel value of the machine learning output image and the weighted pixel value of the tomographic image are combined to obtain a pixel value of the composite image.

6. The medical image processing apparatus according to claim 1, wherein the weight map reflects a distribution of absolute values of differences between the tomographic image and the beam hardening correction image.

7. A medical image processing method comprising the steps of:

obtaining tomographic image data by reconstructing a tomographic image from projection data of an object under examination including a metal;

obtaining machine learning output image data by acquiring a machine learning output image that includes reduced metal artifacts and is output when the tomographic image data of the object under examination and additionally including metal artifacts is input to a machine learning engine that has machine-learned to reduce metal artifacts;

acquiring a weight map in which weight coefficients are mapped, the weight map indicating a probability distribution of presence of metal artifacts;

generating a composite image, by using the weight map indicating the probability distribution of the presence of metal artifacts, to composite the machine learning output image data and the tomographic image data, wherein for the machine learning output image data and the tomographic image data that are composited, an image quality of a region of the machine learning output image that is less affected by the metal artifacts than a corresponding region of the tomographic image that includes the metal artifacts is degraded relative to an image quality of a corresponding region in the tomographic image less affected by the metal artifacts, and an image quality of a counterpart region of the composite image corresponding to the region of the machine learning output image and the corresponding region in the tomographic image is preserved relative to an image quality of the corresponding region in the tomographic image which is composited with the machine learning output image, and wherein the machine learning output image and the tomographic image are composited together by using a value obtained by multiplying the weight coefficient by an adjustment coefficient set in an adjustment coefficient setting portion;

displaying the composite image in a same window as the adjustment coefficient setting portion;

updating the composite image every time the adjustment coefficient is set in the adjustment coefficient setting portion; and displaying the tomographic image and the machine learning output image in the same window.

8. The medical image processing method according to claim 7, wherein the weight map indicates a distribution of absolute values of differences between the tomographic image and a linear interpolation image that is obtained by applying a linear interpolation technique to the tomographic image.

9. The medical image processing method according to claim 7, wherein the weight coefficients become smaller with an increasing distance from a metal pixel extracted from the tomographic image.

10. The medical image processing method according to claim 9, wherein the weight coefficient becomes larger as the metal pixel has a larger pixel value.

11. The medical image processing method according to claim 7, wherein each weight coefficient w is a real number between 0 and 1, and the composite image is generated by compositing the machine learning output image data and the tomographic image data, by applying per-pixel weighting by w and (1−w) and combining weighted values.

12. The medical image processing method according to claim 7, wherein the weight map is acquired based on a beam hardening correction image that is obtained by applying a beam hardening correction to the tomographic image.

13. The medical image processing method according to claim 7, wherein the weight map reflects a distribution of absolute values of differences between the tomographic image and a beam hardening correction image that is obtained by applying a beam hardening correction to the tomographic image.

* * * * *